United States Patent
Lin et al.

(10) Patent No.: US 9,066,112 B2
(45) Date of Patent: Jun. 23, 2015

(54) METHOD AND PRINTING SYSTEM FOR DESIGNING CODE BOOKS FOR SUPER RESOLUTION ENCODING

(75) Inventors: Guo-Yau Lin, Fairport, NY (US); Farzin Blurfrushan, Torrance, CA (US)

(73) Assignee: XEROX CORPORATION, Norwalk, CT (US)

( * ) Notice: Subject to any disclaimer, the term of this patent is extended or adjusted under 35 U.S.C. 154(b) by 164 days.

(21) Appl. No.: 13/564,761

(22) Filed: Aug. 2, 2012

(65) Prior Publication Data
US 2014/0036316 A1    Feb. 6, 2014

(51) Int. Cl.
*H04N 1/40* (2006.01)
*H04N 19/94* (2014.01)

(52) U.S. Cl.
CPC ..................................... *H04N 19/94* (2014.11)

(58) Field of Classification Search
None
See application file for complete search history.

(56) References Cited

U.S. PATENT DOCUMENTS

| | | | | |
|---|---|---|---|---|
| 4,860,358 | A | * | 8/1989 | Rabiner ........................ 704/241 |
| 5,566,001 | A | * | 10/1996 | Saidi et al. .............. 358/426.02 |
| 5,768,470 | A | * | 6/1998 | Muto ............................ 386/355 |
| 5,936,616 | A | * | 8/1999 | Torborg et al. ............... 345/555 |
| 6,298,169 | B1 | * | 10/2001 | Guenter ....................... 382/253 |
| 6,434,275 | B1 | * | 8/2002 | Fukuda et al. ............... 382/275 |
| 6,484,631 | B2 | * | 11/2002 | Degani et al. ................ 101/171 |
| 6,950,557 | B2 | * | 9/2005 | Kimura ........................ 382/239 |
| 7,162,080 | B2 | * | 1/2007 | Chui et al. ................... 382/168 |
| 7,546,240 | B2 | * | 6/2009 | Mehrotra et al. ............ 704/230 |
| 7,636,480 | B2 | * | 12/2009 | Zhang et al. ................. 382/232 |
| 2012/0249618 | A1 | * | 10/2012 | Sugiyama et al. ........... 345/691 |

* cited by examiner

*Primary Examiner* — Steven Kau
(74) *Attorney, Agent, or Firm* — Fay Sharpe LLP

(57) ABSTRACT

A method of designing a code book for super resolution encoding. The method includes, for example, via a processor, creating a first group of entries in the code book that includes a plurality of gray font values for encoding data; via the processor, creating a second group of entries in the code book that includes a set of values for each of the gray font values for decoding data; via the processor, creating a third group of entries in the code book that includes a pattern corresponding to each of the plurality of gray font values; and storing the code book in a database in communication with the processor.

18 Claims, 12 Drawing Sheets

1200 dpi DECODE PATTERNS

| VIDEO DATA | DECODE PATTERN | VIDEO DATA | DECODE PATTERN | VIDEO DATA | DECODE PATTERN |
|---|---|---|---|---|---|
| 0 | | 126 | | 191 | |
| 62 | | 127 | | 192 | |
| 63 | | 128 | | 193 | |
| 64 | | 129 | | 255 | |
| 65 | | 130 | | | |
| 125 | | 190 | | OTHERS | |

FIG. 6

| ENCODED GRAY FONT VALUE | VALUES IN THE DECODE BOOK | PATTERN | ENCODED GRAY FONT VALUE | VALUES IN THE DECODE BOOK | PATTERN | ENCODED GRAY FONT VALUE | VALUES IN THE DECODE BOOK | PATTERN |
|---|---|---|---|---|---|---|---|---|
| 0 | 0-8 | | 102 | 94-110 | | 204 | 196-212 | |
| 17 | 9-25 | | 119 | 111-127 | | 221 | 213-229 | |
| 34 | 26-42 | | 136 | 128-144 | | 238 | 230-246 | |
| 51 | 43-59 | | 153 | 145-161 | | 255 | 247-255 | |
| 68 | 60-76 | | 170 | 162-178 | | | | |
| 85 | 77-93 | | 187 | 179-195 | | | | |

FIG. 8

| ENCODED GRAY FONT VALUE | POSSIBLE RECEIVED VALUE IN DECODER | VALUES IN IMMUTABLE DECODE BOOK | PATTERN | ENCODED GRAY FONT VALUE | POSSIBLE RECEIVED VALUE IN DECODER | VALUES IN IMMUTABLE DECODE BOOK | PATTERN | ENCODED GRAY FONT VALUE | POSSIBLE RECEIVED VALUE IN DECODER | VALUES IN IMMUTABLE DECODE BOOK | PATTERN |
|---|---|---|---|---|---|---|---|---|---|---|---|
| 0 | 0-8 | 0 |  | 102 | 94-110 | 126 |  | 204 | 196-212 | 191 |  |
| 17 | 9-25 | 62 |  | 119 | 111-127 | 127 |  | 221 | 213-229 | 192 |  |
| 34 | 26-42 | 63 |  | 136 | 128-144 | 128 |  | 238 | 230-246 | 193 |  |
| 51 | 43-59 | 64 |  | 153 | 145-161 | 129 |  | 255 | 247-255 | 255 |  |
| 68 | 60-76 | 65 |  | 170 | 162-178 | 130 |  | | | | |
| 85 | 77-93 | 125 | | 187 | 179-195 | 190 |  | | | | |

METHOD AND PRINTING SYSTEM FOR DESIGNING CODE BOOKS FOR SUPER RESOLUTION ENCODING

BACKGROUND

The methods and systems illustrated herein in embodiments are related generally to the art of data compression. More specifically, methods and systems will be described for compressing high or super resolution image data for storage and/or transmission. Embodiments will be described with reference to compressing high or super resolution image data associated with text or line art. However, embodiments may be beneficially implemented in other data compression applications.

By way of background, advancements in the computational power of image processors and the rendering resolution of marking engines have outpaced advancements in data storage and transmission. That is, image processors and image rendering devices or marking engines for achieving a given image quality and image throughput (e.g., pages per minute) are relatively inexpensive when compared to the cost of data storage and transmission components that would be required to support that given image quality and throughput. Nevertheless, it is desirable to achieve the benefits of high speed data processing and high resolution image rendering.

For example, it is desirable to render text and line art, which can include curves and diagonal lines, with high or super resolution, such as, for example, 1200, 2400 or 3600 spots per inch (spi), in order to reduce or avoid perceptible jaggedness or "jaggies" in the rendered or printed text or line art.

In order to take full advantage of the jaggedness reducing aspects of super or high resolution rendering, it is necessary for an image source, such as an image processor or Digital Front End (DFE) to perform high or super resolution digital image processing. For example, a DFE may raster image process (RIP) a Page Description Language (PDL) version of an image to a high or super resolution to provide for better edge position estimation and to provide a reduction in perceived jaggedness in a rendered version of the image.

However, a single page of high or super resolution (e.g., 2400 spi) binary or bit map color image data can require up to two gigabytes or more of data storage and/or transmission. Furthermore, in production printing environments, it is common to render over 100 pages per minute. Therefore, the cost of providing storage and communication resources adequate to the task of super resolution data storage and transmission can be quite high.

Super Resolution Encoding (SRE) is one way of achieving high resolution quality text and graphics. High resolution patterns are encoded as gray pixel values at lower resolution and then decoded on the image output terminal (IOT). In order to recover the original high resolution patterns, the gray values need to be preserved. Unfortunately very complex pages can require lossy compression, including lossy compression of the gray values, resulting in completely different gray values delivered to and rendered by the IOT.

The original SRE patterns were designed assuming lossless compression. The patterns are arranged in no particular order. In the case of 1200 DPI, only the 16 possible values had a valid pattern with all other gray values having a blank pattern. This would result in drop outs as well as wrong patterns if compression or other alterations in the data path change the gray values.

In certain applications there can be lossy compression. Less complex pages avoid doing lossy compression on SRE objects, but in very complex pages the problem cannot be avoided, which can result in alteration of the SRE values. Other modules in the image path may also cause the value to be changed.

Therefore, there is a desire for methods and systems for compressing or encoding high or super resolution image data while preserving the beneficial aspects provided by high or super resolution image processing and rendering.

BRIEF DESCRIPTION

In one embodiment, a method of designing a code book for super resolution encoding is provided. The method may include, for example, via a processor, creating a first group of entries in the code book that includes a plurality of gray font values for encoding data; via the processor, creating a second group of entries in the code book that includes a set of values for each of the gray font values for decoding data; via the processor, creating a third group of entries in the code book that includes a pattern corresponding to each of the plurality of gray font values; and storing the code book in a database in communication with the processor. Optionally, the sets of values in the second group of entries may comprise evenly-spaced target patterns configured to encode value mapping. Further, spacing between the target patterns and the corresponding encode values may be optimized based on the frequency of the occurrences, wherein the more often a target pattern is selected, the wider space it is between its adjacent encode value.

In another embodiment, an image processing method is provided. The method may include, for example, receiving encode values at a decoder; and filling mappings from the received encode values to decode patterns with similar adjacent patterns, wherein if the received encode value is distorted within a tolerance it will still be correctly decoded.

In yet another embodiment, a xerographic printing system is provided. The system may include, for example, an immutable decode book stored in a database; a decoder that receives encoding values; and a mapping function that is configured to map at least one of the received encoding values to an immutable code value in the immutable decode book. Alternatively, the mapping function may be implemented in the place of a user tone reproduction curve (TRC) or in place of a calibration tone reproduction curve (TRC).

In yet another embodiment, a method of encoding high resolution data associated with a relatively large number of bits to an encoded form having a relatively reduced number of bits is provided. The method may include, for example, pre-defining a plurality of high-output-resolution output patterns; associating respective high-output-resolution output patterns of the plurality with respective sets of consecutive encoded resolution bit patterns having the reduced number of bits; receiving a block of high-input-resolution input data; determining a respective difference between a pattern of the received block of high-input-resolution input data and each of the respective high-output-resolution output patterns; selecting a respective high-output-resolution output pattern associated with a lowest respective difference to be a representative high-output-resolution output pattern for the received block of high-input-resolution input data; and encoding the received block of high-input-resolution input data as a median member of the respective set of consecutive encoded resolution bit patterns having the reduced number of bits associated with the selected respective representative high-output-resolution output pattern.

In yet another embodiment, a system for encoding data associated with a relatively large number of bits to an encoded form having a relatively reduced number of bits is provided.

The system may include, for example, a library of respective high-output-resolution output patterns associated with respective sets of consecutive encoded resolution bit patterns having the reduced number of bits; a data analyzer that is operative to receive a block of high-input-resolution input data and determine a respective difference between a pattern of the received block of high-input-resolution input data and each of the respective high resolution output patterns; a block selector that is operative to select a respective high-output-resolution output pattern associated with a lowest respective difference to be a representative high-output-resolution output pattern for the received block of high-input-resolution input data; and an encoder that is operative to encode the received block of high-input-resolution input data as a median member of the respective set of consecutive encoded resolution bit pattern, having the reduced number of bits, associated with the selected respective representative high-output-resolution output pattern, thereby generating an encoded block of data.

In yet another embodiment, a method of encoding input data having an input resolution to an encoded form having an encoded resolution is provided. The method may include, for example, predefining a plurality of respective output-resolution output patterns; associating the respective output-resolution output patterns with respective sets of consecutive encoded resolution encoded patterns, wherein the encoded resolution is lower than both the input resolution and the output resolution; receiving input-resolution input data; determining one of a number bits that do not match between a bit pattern of the input-resolution input data and a bit pattern of each respective output-resolution output pattern, a number of area portions that do not match between an area pattern of the input-resolution input data and an area pattern of each respective output-resolution output pattern, a sum of magnitudes of differences, a sum of squares of differences and a root mean square of differences between respective contone, multi-gray level or quantization values of the received block of input-resolution input data and respective contone, multi-gray level, or high-addressable quantization values of each output-resolution output pattern, thereby determining a respective difference between a pattern of the input-resolution input data and each of the respective output-resolution output patterns; selecting a respective output-resolution output pattern associated with a lowest respective difference to be a representative output-resolution output pattern for the input-resolution input data; and encoding the input-resolution input data as a median member of the respective sets of consecutive encoded resolution encoded pattern associated with the selected respective output-resolution output pattern.

BRIEF DESCRIPTION OF THE DRAWINGS

FIG. 6 shows the 1200 dpi decode patterns;

FIG. 8 shows one embodiment of a set of robust super resolution encoding screens;

DETAILED DESCRIPTION

Figure 1:
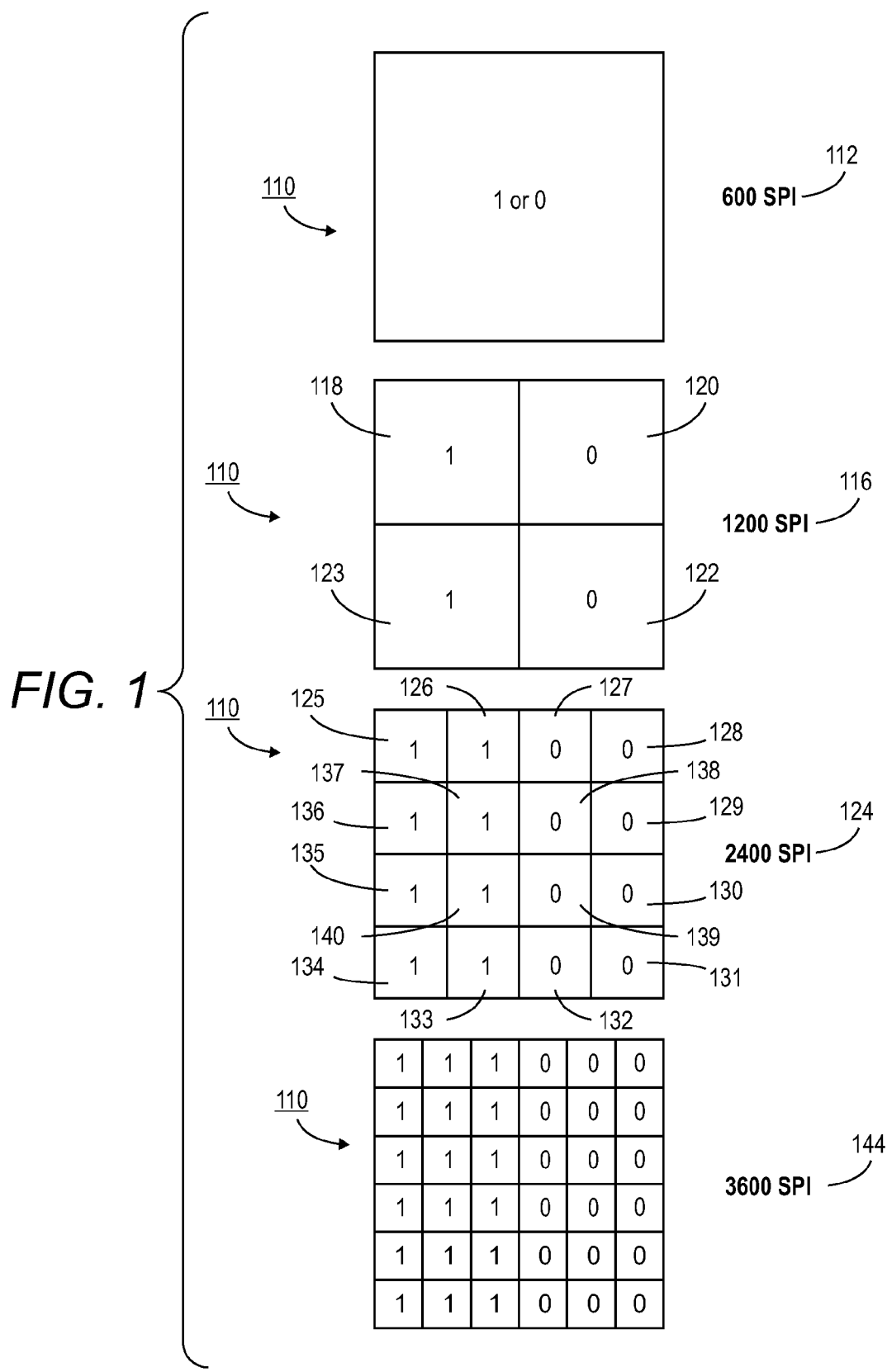
FIG. 1 includes a depiction of an image area in relation to several different respective spot sizes associated with several different respective image rendering resolutions.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. When an item of data can indicate one of a number of possible alternatives, the item of data has one of a number of "values." The term "data" includes data existing in any physical form, and includes data that are being stored or transmitted. An "image" is a pattern of physical light. An image may include characters, words, and text as well as other features such as graphics. An image may be divided into "segments," each of which is itself an image. A segment of an image may be of any size up to and including the whole image.

A "pixel" is the smallest segment or region into which an image is divided in a given system.

A "memory" or "storage medium" is a physical medium that can store data. Examples of data storage media include magnetic media such as hard and floppy disks, and magnetic tape; optical media such as laser disks and CD-ROMs; and semiconductor media such as semiconductor ROMs and RAMs.

An operation "encodes" or "compresses" items of data, when performing the operation on the items of data produces different items of data from which the encoded or compressed data items can subsequently be recovered. The operation that recovers the encoded or compressed data items is "decoding" or "decompressing." When the operation is "lossy", the decoding or decompressing operation only recovers data that is approximately the same as the original data.

An "image output terminal" (IOT) is a device that can receive an item of data defining an image and provide the image as output. A "display" is an image output device that provides the output image in human viewable form and a "printer" is an image output device that renders the image on a substrate in human viewable form. The visible pattern presented by a display is a "displayed image" or simply "image."

Referring to FIG. 1, an image area 110 can be associated with marking spots of different sizes or pitch. For example, a 600 spot per inch (spi) 112 rendering resolution is common. However, the 600 spi resolution 112 is associated with limited image quality. For instance, at 600 spi resolution 112, the image area 110 must either be completely marked (e.g., associated with the value 1) or unmarked (e.g., associated with the value 0). If the marking resolution is increased, additional detail can be provided. For instance, at a 1200 spi resolution 116, the image area 110 is associated with 4 markable spot positions 118, 120, 122, 123. Each of the 4 spot positions can be marked or unmarked. This means that at 1200 spi resolution 116, the image area 110 can represent 5 shades of gray (completely marked, completely unmarked, or 1, 2 or 3 sub areas marked). Additionally, the sub areas can be marked with 14 different spatial orientations or patterns for a total of 16 possible patterns in the image area 110. At a 2400 spi resolution 124, the image area 110 is associated with 16 spot or marking areas 125-140, and the image area can represent 17 shades of gray or lightness. Additionally, marks can be distributed over the image area 110 in over 65,500 patterns or arrangements of marked or unmarked spots. At 3600 spi resolution 144, the image area 110 is associated with 36 markable spots, which can be associated with 37 shades of gray or lightness and over 68 billion arrangements of marked and unmarked spots or patterns.

The increase in the number of markable patterns associated with an increase in marking resolution can provide an increase in image quality. For instance, a sharpness with which text and line art can be rendered is increased with increasing marking resolution.

Figure 2:
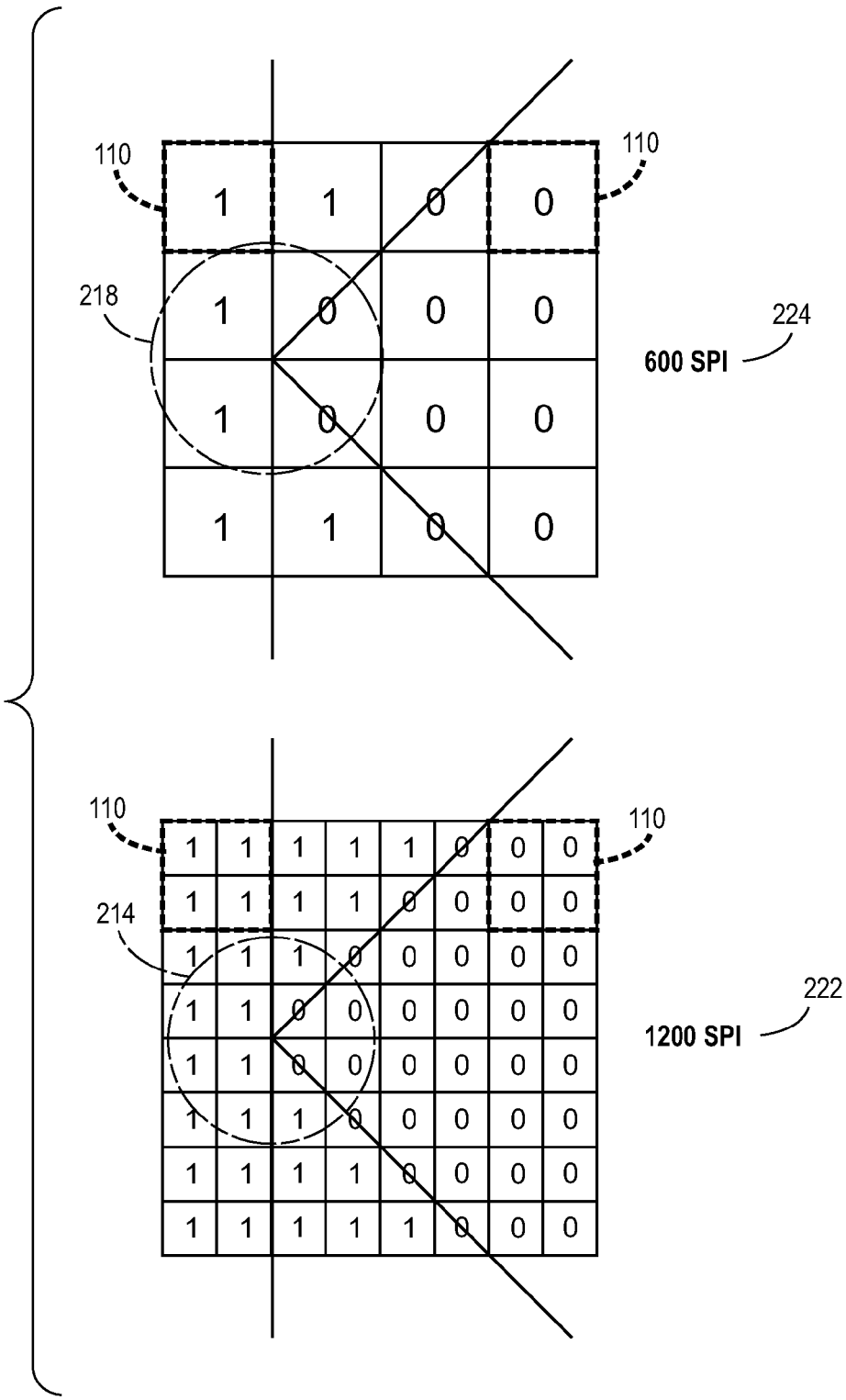
FIG. 2 includes a depiction of an image area associated with a portion of an image of text at two different image resolutions.

For example, referring to FIG. 2, an intersection 214, 218 of a vertical line and two diagonal lines is rendered with increased precision and a decrease in perceptible jaggedness at 1200 spi resolution 222 as compared to the rendering possible at 600 spi resolution 224. Further image improvements are possible when rendering is carried out at even higher resolutions (e.g., 2400 spi, 3600 spi). However, as indicated above, storing and communicating high or super high resolution data can be prohibitively expensive.

Figure 3:
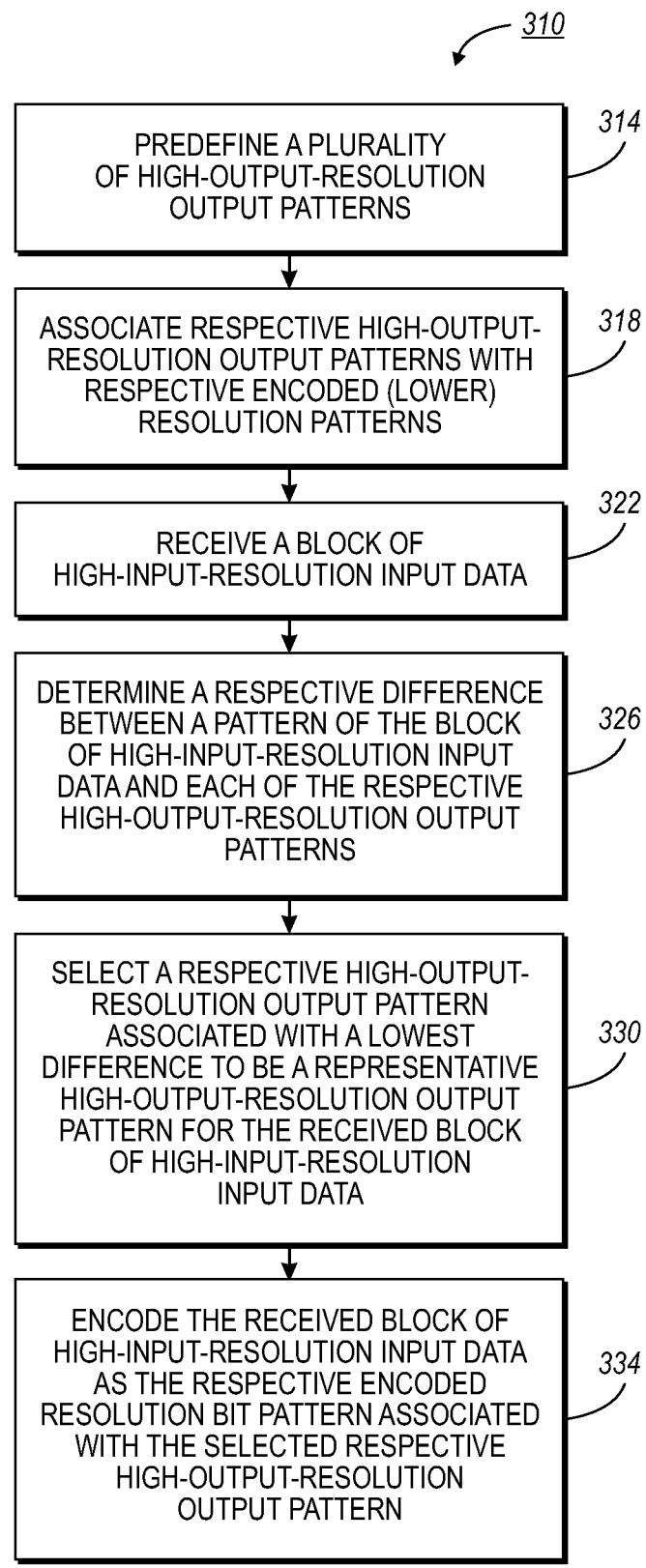
FIG. 3 is a flow chart outlining a method for encoding data.

Referring to FIG. 3, a method 310 for encoding high resolution data associated with a relatively large number of bits to an encoded form (that can be reasonably stored and communicated) having a relatively reduced number of bits can include predefining 314 a plurality of high-output-resolution output patterns, associating 318 respective high-output-resolution output patterns with respective encoded (lower) resolution bit patterns, receiving 322 a block of high-input-resolution input data, determining 326 a respective difference between a pattern of the block of high input data and each of the respective high-output-resolution output patterns, and selecting 330 a respective high-output-resolution output pattern associated with a lowest difference to be a representative high-output-resolution output pattern for the received block of high-input-resolution input data and encoding 334 the received block of high-input-resolution input data as the respective encoded resolution bit pattern associated 318 with the selected respective high-output-resolution output pattern.

Predefining 314 a plurality of high-output-resolution output patterns can include identifying important high resolution output patterns. For instance, the importance of an output pattern may be related to the frequency with which the output pattern would be used. A test image can be divided into blocks and statistically analyzed to determine a frequency of occurrence of various block patterns. Identified patterns that occur most frequently, as determined through the statistical analysis, can be identified or labeled as most important output patterns. Additionally, or alternatively, other factors may be considered when predetermining 314 the plurality of high-output-resolution output patterns.

For instance, output patterns most likely to benefit from high resolution rendering, such as, for example, patterns associated with diagonal lines and curves may be included in the predefined 314 plurality of high-output-resolution output patterns. Additionally, or alternatively, output patterns that exhibit a high level of compactness and, therefore, a high level of renderability, may be included in the predetermined 314 plurality of high-output-resolution output patterns.

The number of high resolution output patterns included in the predefined 314 plurality may be a function of the number of bits to be included in the encoded resolution bit pattern. For example, where it is desired to encode blocks of 16 bits of 2400 spi data or blocks of 36 bits of 3600 spi data with 8 bits of encoded or low resolution data, there may be 256 high-output-resolution output patterns in the predefined 314 plurality. That is, of the over 65,500 possible patterns at 2400 spi or the over 68 billion patterns available at 3600 spi, 256 patterns would be included in the predefined 314 plurality if it is desired to encode such patterns with just 8 bits.

For instance, associating 318 respective high-output-resolution output patterns with respective encoded resolution bit patterns can include a simple random assignment or enumeration of the plurality of predefined 314 output patterns. For instance, each of the output-resolution output patterns of the predefined 314 plurality can be assigned a number from 0 to 255 in some arbitrary manner. Alternatively, as will be illustrated below, each output-resolution output pattern in the predefined 314 plurality can be associated with a low or encoded resolution pattern that represents the high resolution output pattern.

Receiving 322 a block of high-input-resolution input data can include receiving a block of data at any resolution for which storage or transmission at a lower resolution is desired. In this regard, the phrase—high input resolution—refers to any resolution higher than the encoded resolution. Similarly, the phrase—high output resolution—refers to any resolution higher than the encoded resolution. The input and output resolutions may be the same or different. The received 322 input data can be a portion of a binary bit map (e.g., FIG. 1, FIG. 2) or as will be explained in greater detail below, can include contone, multi-gray level or high-addressable data indicating levels of gray or lightness beyond the two levels represented by binary data. The received 322 input data may be associated with one or more tags indicating, for example, that the data is related to text and/or line art, or a portion of an image for which high resolution rendering is desired.

Figure 4:
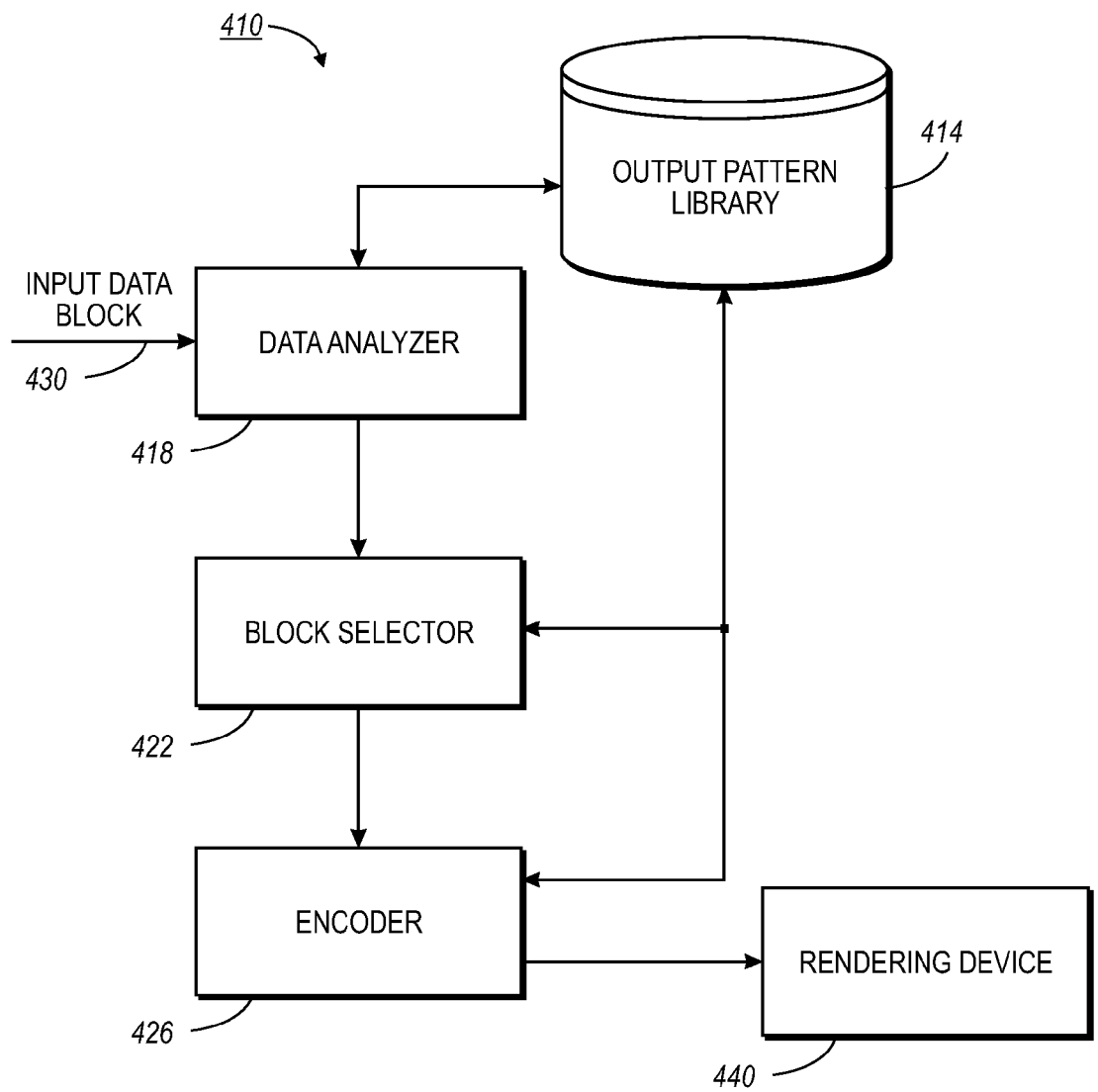
FIG. 4 is a block diagram of an illustrative system that is operative to perform data encoding according to embodiments of the method of FIG. 3.

Referring to FIG. 4, a system 410 that is operative to encode data associated with a relatively large number of bits to an encoded form having relatively reduced number of bits can include a library 414 of respective high-output-resolution output patterns associated 318 with respective encoded resolution bit patterns having the reduced number of bits. Additionally, the system 410 can include a data analyzer 418, a block selector 422 and an encoder 426. For instance, the data analyzer 418 may be operative to receive 322 a block 430 of high-input-resolution input data and determine 326 a respective difference between a pattern of the received 322 block of high-input-resolution input data and each of the respective high resolution output patterns of the library 414. The block selector 422 may be operative to select 330 a respective high-output-resolution output pattern from the library 414. For instance, the block selector 422 is operative to select 330 the respective high-output-resolution output pattern associated with the lowest difference as determined 326 by the data analyzer 418. The block selector 422 selects 330 the output pattern associated with the lowest respective difference to be a representative high-output-resolution output pattern for the received 322 block of high-input-res The encoder 426 may be operative to encode 334 the received 322 block of high-input-resolution input data as the respective encoded resolution bit pattern associated 318 with the respective representative high-output-resolution output pattern selected 330 by the block selector 422.

For instance, the block 430 of input data may be a block of image data and the system 410 may include or be associated with a rendering device (or image output terminal) 440. For instance, the rendering device 440 may be a display device or a marking engine, such as, for example, an ink jet, xerographic or electrophotographic marking engine or printer. For instance, the encoder 426 encodes 334 the received 322 block 430 of data prior to storing or transmitting the data in association with a rendering process of the rendering device 440.

The data analyzer 418, block selector 422 and encoder 426 can be implemented in various combinations of hardware and software. The output pattern library 414 can be implemented in any computer storage medium including, but not limited to, rotating media, such as magnetic hard drives, optical disks and floppy disks. Additionally, or alternatively, the library 414 can be implemented in programmed or configured memory devices, such as read only memory (ROM), random access memory (RAM), programmable read only memory (PROM), electrically erasable programmable read only memory (EEPROM) and FLASH memory.

The data analyzer 418 can be operative to determine 326 the respective difference by any of the techniques described above with reference to FIG. 3 including, but not limited to, by determining a number of bits that do not match between a bit pattern of the block of high-input-resolution input data and a bit pattern of each respective high-output-resolution output pattern, determining a sum of magnitudes of differences, a sum of squares of differences and a root-mean square of differences between respective contone, multi-gray level or high-addressable quantization values of the received 322 block 430 of high-input-resolution input data and respective contone, multi-gray level or high-addressable quantization values of each respective high-output-resolution output pattern, and by determining area portions that do not match between an area pattern of the received 322 block 430 of high-input-resolution input data and area patterns of each respective high-output-resolution output pattern.

The block selector 422 may be operative to select the respective output-resolution output pattern by any of the techniques described above with reference to FIG. 3 including, but not limited to, selecting an output-resolution output pattern associated with a lowest respective difference or associated with a lowest respective difference and a most favorable rating in a second characteristic, such as, for example, a most favorable or highest level of compactness or highest degree of clustering.

Thus, Super Resolution Encoding (or SRE) as described above is a way of encoding a bit pattern in higher resolution into a Gray value (called Gray Font). Similar to Anti-Aliasing, objects are rendered at a higher resolution. The main difference is that for Anti-Aliasing we are averaging the pixel values at the higher resolution to create new gray values. These values are typically half-toned at the image output terminal (or IOT) when printing. For SRE the system is encoding high resolution pixel patterns into gray values instead of averaging. A special tag is added to tell the IOT that the pixel is an encoded Gray Font value. The IOT will decode the tag and SRE to recreate the original pattern in high resolution.

Figure 5:
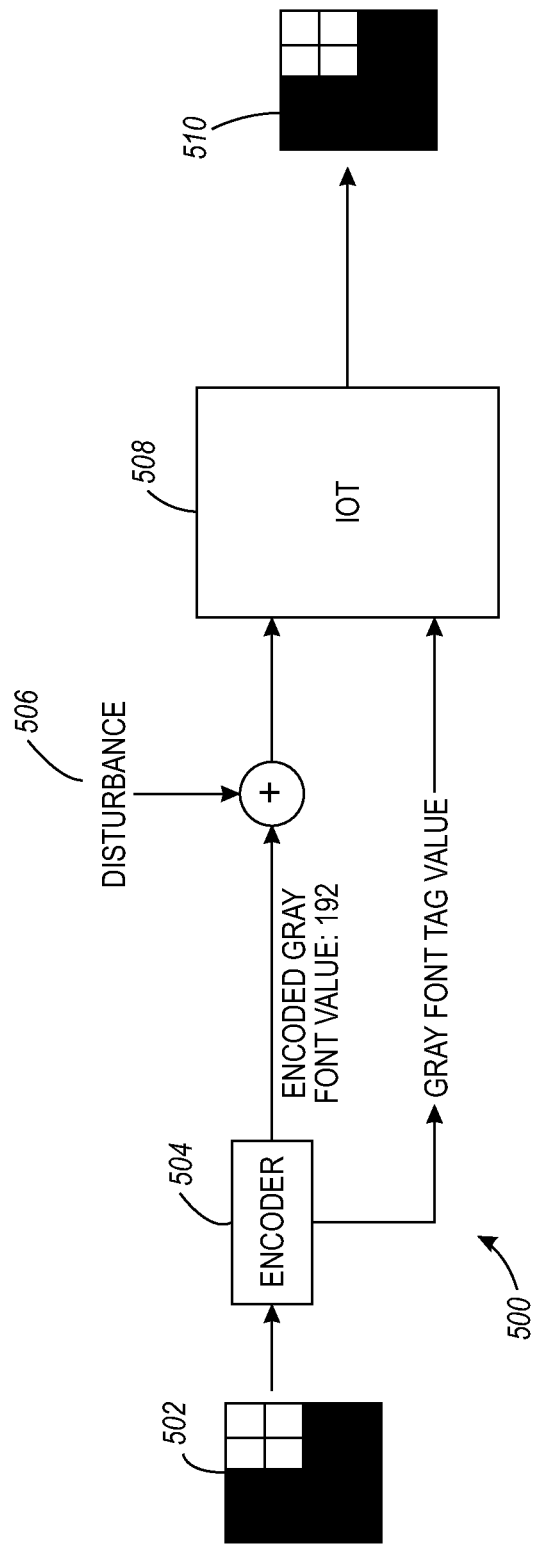
FIG. 5 is a block diagram showing the super resolution encoding/decoding path.

FIG. 5 shows the basic concept behind SRE. In particular, FIG. 5 shows the Super Resolution Encoding/Decoding path 500. Initially, a high resolution input pattern 502 is encoded via an encoder 504. A disturbance 506 can be caused by compression. If the disturbance is 0, then the IOT 508 will receive the encoded gray font value (e.g., 192) precisely, and it will correctly decode the desired output pattern 510. If the disturbance is non-zero, e.g. −3, the IOT 508 will try to decode the adjusted gray font value (e.g., 189) and consequently produce a potentially inappropriate pattern. If the inappropriate pattern happens to be a blank pattern and the input pattern has a non-blank pattern, it could be perceived as a "dropout".

Gray Font/SRE patterns/screens may be defined at resolutions of 1200 DPI and 2400 DPI, for example. For 2400 DPI SRE there are 16 high resolution pixels for each gray pixel in 600 DPI. There are $2^{16}$ possible patterns, but only a maximum of 256 patterns can be encoded in an 8 bit gray value. The 256 most common patterns may be chosen. These are the patterns that are used to define, or approximate, the edges of text and graphics with the observation that patterns containing scattered dots are not found often in common text and graphics. For 2400 SRE, some pattern matching needs to be done to choose the closest possible Gray Font pattern if the desired pattern is not part of 256 patterns. In the case of 1200 SRE there is always an exact match, since there are only 16 possible patterns ($2^4$).

FIG. 6 shows an example of a full Gray Font mapping for a possible 16 patterns in 1200 SRE. The first column (610) lists video data that have been encoded for any input patterns, while the next column (620) lists a corresponding decode pattern for the video data. By way of example, each of the values shown (0, 62, 63, 64, 65, 125, 126, 127, 128, 129, 130, 190, 191, 192, 193, 255) has a corresponding pattern. It is to be understood, however, that one or more other values and/or patterns may be used. Each 600 dpi pixel is shown as a 4×4 block 630. Note that the addressable pixel size is 1200 dpi, shown as a 2×2 block 640. Further, 1200 SRE Gray Font Patterns and Encodings can be different than 2400 SRE. The IOT specifications would typically show the complete pattern set.

In general, the video data in FIG. 6 is what has been encoded; the mapping from input pattern to the encoded value is typically many to one. The decoding or the process of mapping from the encoded value to the decoded pattern is also many to one, although in FIG. 6 it shows 16 one-to-one mapping or decoding pairs, and one 239-to-one mapping for the blank pattern. This encoding/decoding look-up-table is generally referred to as the "code book."

Figure 7:
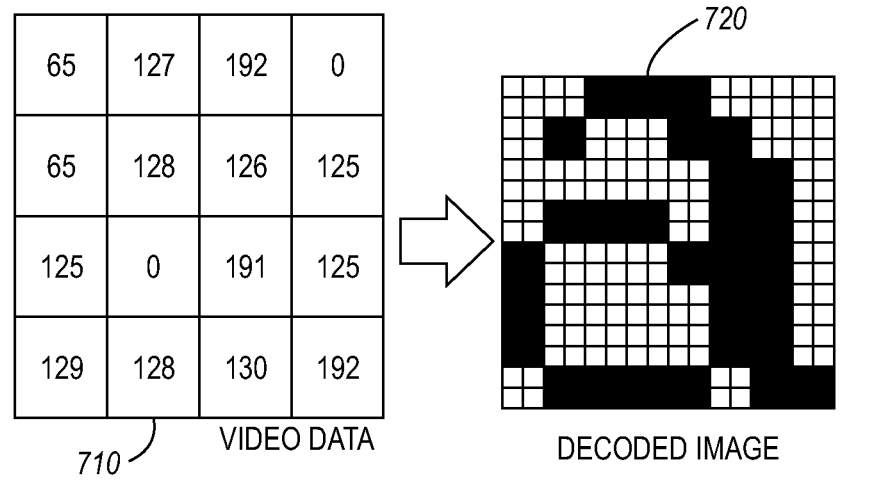
FIG. 7 shows an example of a decoded image.

With reference to the example in FIG. 7, where a bitmap of letter "a" is being encoded, one can see that any change due to lossy compression in the encoded Gray Font value (e.g., Video Data 710) will generally result in a decoded image 720 with a completely different pattern. A blank pattern is produced if the encoded Gray Font value changes to anything other than one of the 16 values, which typically causes dropouts for the impacted pixels and thus results in an undesired artifact.

It is possible to design a better code book by programming the 256 patterns. This provides a way to solve both problems for the 1200 SRE. By spacing the Gray Font values and replicating the pattern around the Gray Font values, gaps can be filled in and there is some margin in the case that some variation of gray value occurs due to lossy compression. In other words, if the encoded Gray Font value changes by a certain margin but stays within the replicated range, the correct pattern will still be produced. Utilizing all 256 entries for decoding solves the problem of dropouts.

FIG. 8 shows three different columns of the code book: a first column 810 includes the 16 gray font value used for encoding (e.g., 0, 17, 34, 51, 68, 85, 102, 119, 136, 153, 170, 187, 204, 221, 238, 255), a second column 820 includes the 16 corresponding sets of values used for decoding (e.g., 0-8, 9-25, 26-42, 43-59, 60-76, 77-93, 94-110, 111-127, 128-144, 145-161, 162-178, 179-195, 196-212, 213-229, 230-246, 247-255), and a third column includes the 16 corresponding patterns. It is to be understood, however, that one or more other values and/or ranges of values may be used. Each 600 dpi pixel is shown as a 4×4 block 830. Note that the addressable pixel size is 1200 dpi, shown as a 2×2 block 840. It is also noted that the same 16 patterns as in FIG. 6 for 1200 SRE are shown, but this time the encoded Gray Font values are evenly spaced. Likewise, one or more other types of patterns may be used. An Encoded Gray Font value is used in the raster image processor (RIP) to specify what pattern to use for a specific pixel. Thus, for each decoded value there is a corresponding pattern, and there are no drop-outs caused by the blank pattern for undefined code values. In addition, as long as the variation or disturbance in the imaging path (possibly caused by compression) is within a range, the decoded pattern will still be the same as what was intended.

Figure 9:
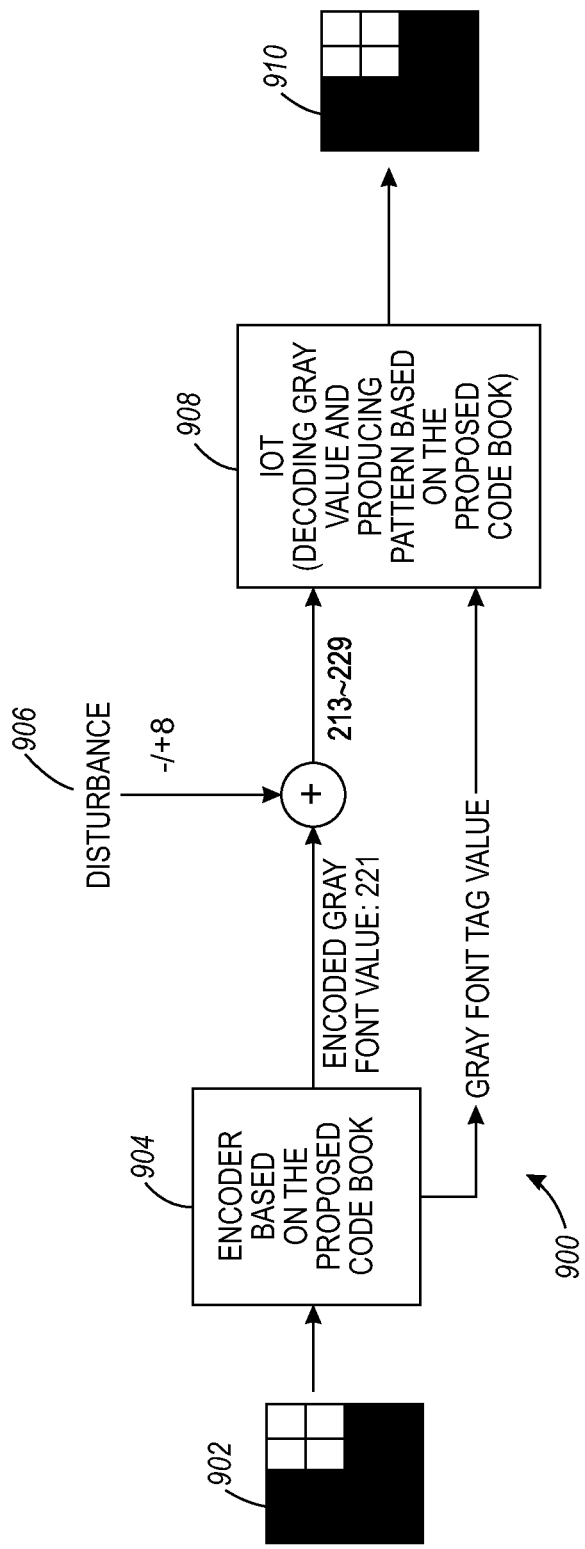
FIG. 9 is a block diagram showing a robust encoding/decoding scheme in accordance with aspects of the exemplary embodiment.

FIG. 9 shows a Super Resolution Encoding/Decoding path 900 in accordance with aspects of the exemplary embodiment. Initially, an input pattern 902 is encoded based on the new code book via an encoder 904. As explained earlier, a disturbance 906 can be caused by compression. When the IOT 908 receives a value other than those 16 encoded values (e.g., 0, 17, 34, 51, 68, 85, 102, 119, 136, 153, 170, 187, 204, 221, 238, 255), there is still a reasonable pattern corresponding to it. That is, the IOT 908 decodes the gray value and produces an output pattern 910 based on the new code book. Although an evenly spaced method is described here, it is possible to use a non-evenly spaced code book based on the compression, disturbance characteristics, and how common or uncommon certain patterns are, among other things.

Figure 10:
FIG. 10 shows another embodiment of a set of robust super resolution encoding screens.
Figure 10:
Figure 10:
Figure 10:
Figure 10:
Figure 10:
Figure 10:
Figure 10:
Figure 10:
Figure 10:
Figure 10:
Figure 10:
Figure 10:
Figure 10:
Figure 10:

Alternatively, the encoded values may be spaced out so that between any two values there is some margin in case some variation of gray value happens due to lossy compression. By way of example, FIG. 10 shows an alternative code book with four different columns: a first column 1010 includes the 16 encoded gray font value (e.g., 0, 17, 34, 51, 68, 85, 102, 119, 136, 153, 170, 187, 204, 221, 238, 255), a second column 1015 includes ranges of possible values that may be received at the decoder (e.g., 0-8, 9-25, 26-42, 43-59, 60-76, 77-93, 94-110, 111-127, 128-144, 145-161, 162-178, 179-195, 196-212, 213-229, 230-246, 247-255), a third column 1020 includes the 16 corresponding values from an immutable decode book (e.g., 0, 62, 63, 64, 65, 125, 126, 127, 128, 129, 130, 190, 191, 192, 193, 255), and a fourth column includes the 16 corresponding patterns. It is to be understood, however, that one or more other values and/or ranges of values may be used. Each 600 dpi pixel is shown as a 4×4 block 1035. Note that the addressable pixel size is 1200 dpi, shown as a 2×2 block 1040. Likewise, one or more other types of patterns may be used. However, this time the encoded Gray Font values are evenly spaced and different from the values in the decode book. Although the evenly spaced method is described here, it is also possible to use a non-evenly spaced code book based on the compression, disturbance characteristics, and how common or uncommon certain patterns are. Note that an immutable decode book is dealt with here. This is because, for example, the decode book may have been implemented by the printer vendor, and in that case it cannot be changed.

Mapping the range of SRE values with added disturbance to specific values may be performed by applying a tone reproduction curve (TRC) rather than having a replicated SRE pattern in the IOT. By mapping multiple values to the same predefined value, it is possible to remove the drop-out issue and improper changing of SRE values for most cases. In this regard, an alternative embodiment involves the use of tone reproduction curves (TRCs). Therefore, a brief discussion of TRCs is set forth below.

It is well known that marking devices provide native or machine resolution corresponding to the physical dots or pixels of toner, ink, or other marking material that are marked on a sheet of paper or other media sheet. The marking densities, or the amount of marking material in each physical dot, or similar marking characteristics are impacted by various physical parameters of the marking process. The controls that determine these physical parameters are sometimes referred to as actuators.

In halftone marking, a binary "on/off" paradigm is employed for marking pixels. Relatively darker regions have a relatively higher density of marked pixels as compared to lighter regions. In one approach, the pixels of the marked area are delineated into halftone cells, which are also sometimes referred to as "halftone dots". Each pixel of a halftone cell or dot is assigned a threshold level. Whether a given pixel is "on" or "off" is determined by comparing the threshold level of that halftone pixel with a density level intended for that pixel. The thresholds are selected such that, for a uniform density level across the halftone dot, the fraction of "on" pixels is visually perceived as an average density corresponding to the desired uniform density level. A halftone dot represented by pixel thresholds is referred to as a halftone screen.

The fraction of pixels that are on determines the effective or average density. The distribution of those pixels within the halftone dot (or, correspondingly, the distribution of thresholds within the halftone screen) can impact the image quality. The target or nominal density curve is suitably represented by an array of values, in units appropriate to the sensor, with a discrete value for each printable level. A typical printing system might have 256 (8-bit) or 1024 (10-bit) distinct printable density levels. The thresholds of the halftone screen are selected such that, ideally, a density level represented by a value in the range 0-255 (assuming 8-bit representation), when mapped as a uniform density to halftone and marked by the marking device, appears visually to be at the nominal density value. The relationship between the actual densities provided by the marked halftone dots for uniform patches of the printable density levels is sometimes referred to as the tone reproduction curve (or TRC). Ideally, the TRC should be linear with a slope of unity. This gives the minimum step size between any two adjacent levels, resulting in a smooth visual response. This ideal response has also been incorporated in existing standards for offset printing of digital images which are used in customer image processing applications.

Figure 11:
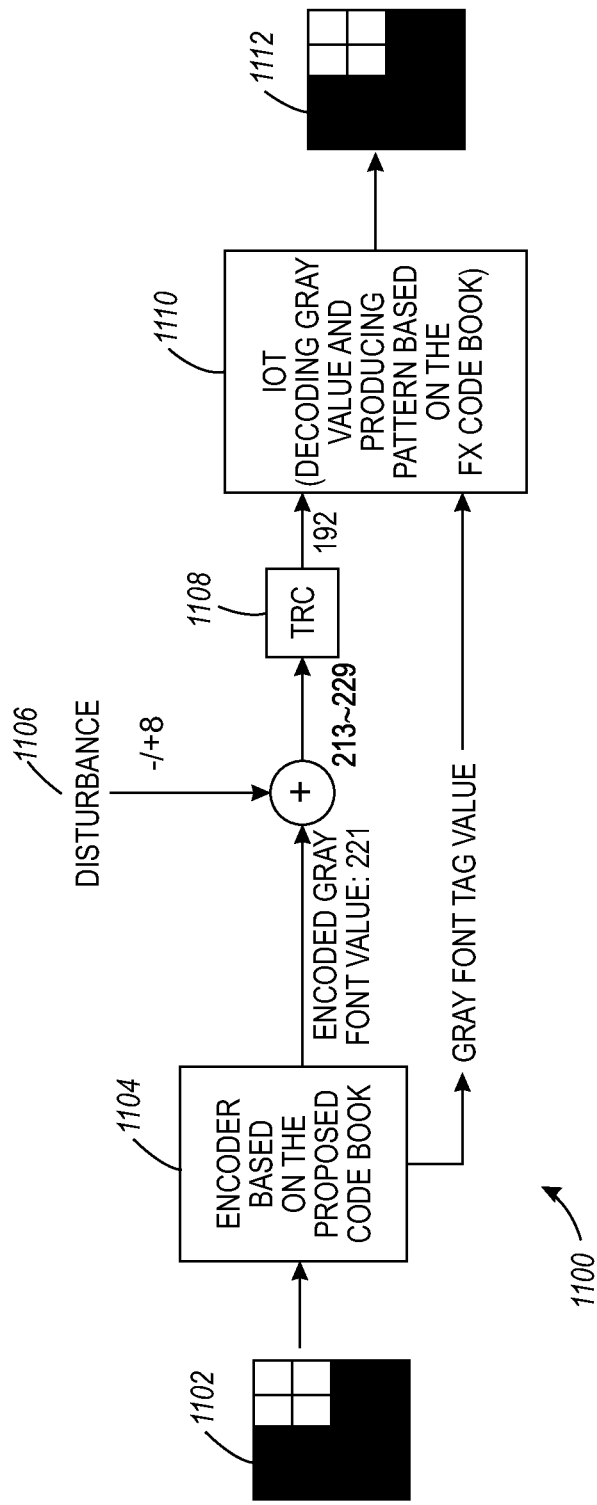
FIG. 11 is a block diagram showing an alternative robust encoding/decoding scheme using a TRC.

FIG. 11 shows an alternative Super Resolution Encoding/Decoding path 1100 in accordance with other aspects of the exemplary embodiment. Initially, an input pattern 1102 is encoded based on the new code book via an encoder 1104. As explained earlier, a disturbance 1106 can be caused by compression. In this case, a TRC 1108 may be added to the path. When the IOT 1108 receives a value other than one of the 16 encoded values (e.g., 0, 17, 34, 51, 68, 85, 102, 119, 136, 153, 170, 187, 204, 221, 238, 255), there is still a reasonable pattern corresponding to it. That is, the IOT 1110 decodes the gray value and produces an output pattern 1112 based on the new code book or a special TRC.

Figure 12:
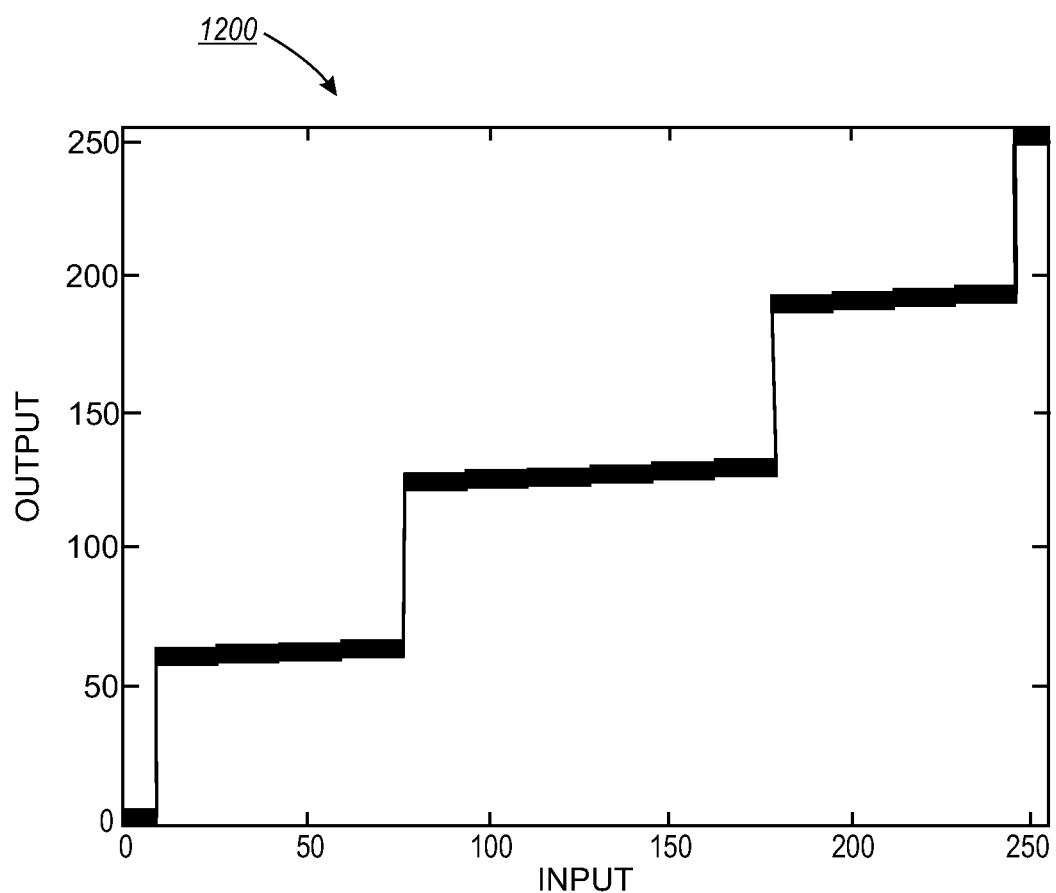
FIG. 12 shows a mapping function that could be used in place of a TRC in FIG. 11.

FIG. 12 shows a mapping function 1200 that could be used in place of a TRC for robust SRE when SRE code is predefined. This mapping function maps the distorted encoded values to one of the predefined code that the print engine expects through the immutable decode book.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

Further, the exemplary embodiments may be implemented in a computer program product that may be executed on a computing device. The computer program product may be a non-transitory computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of designing a code book for super resolution encoding in an image rendering system, the method comprising:
via a processor, creating a first group of entries in the code book that includes a plurality of gray font values for encoding data;
via the processor, creating a second group of entries in the code book that includes a set of values for each of the gray font values for decoding data, wherein the sets of values in the second group of entries comprise target patterns configured to encode value mapping;
via the processor, creating a third group of entries in the code book that includes a pattern corresponding to each of the plurality of gray font values; and
storing the code book in a database in communication with the processor, wherein spacing between the target patterns and the corresponding encode values is optimized based on the frequency of the occurrences, wherein the more often a target pattern is selected, the wider the space between an adjacent encode value.

2. The method of claim 1, further comprising:
receiving encode values at a decoder, wherein the decoder includes a set of decode patterns based on the code book; and
filling mappings from the received encode values to decode patterns with similar adjacent patterns, wherein if the received encode value is distorted within a given tolerance it will still be correctly decoded.

3. The method of claim 1, wherein the sets of values in the second group of entries comprise evenly-spaced target patterns.

4. The method of claim 1, wherein the sets of values in the second group of entries comprise non-evenly-spaced target patterns, based upon compression or disturbance characteristics.

5. The method of claim 1, wherein the first group of entries in the code book includes sixteen gray font values.

6. The method of claim 1, wherein an addressable pixel size is 600 dpi or 1200 dpi.

7. The method of claim 1, wherein the printing system comprises a Xerographic printing system.

8. A system for designing a code book for super resolution encoding, the system comprising:
a database in communication with one or more processors; and
the one or more processors configured to:
create a first group of entries in the code book that includes a plurality of gray font values for encoding data;
create a second group of entries in the code book that includes a set of values for each of the gray font values for decoding data, wherein the sets of values in the second group of entries comprise target patterns configured to encode value mapping;
create a third group of entries in the code book that includes a pattern corresponding to each of the plurality of gray font values; and
store the code book in the database, wherein spacing between the target patterns and the corresponding encode values is optimized based on the frequency of the occurrences, wherein the more often a target pattern is selected, the wider the space between an adjacent encode value.

9. The system of claim 8, wherein the sets of values in the second group of entries comprise evenly-spaced target patterns.

10. The system of claim 8, wherein the sets of values in the second group of entries comprise non-evenly-spaced target patterns, based upon compression or disturbance characteristics.

11. The system of claim 8, wherein the first group of entries in the code book includes sixteen gray font values.

12. The system of claim 8, wherein an addressable pixel size is 600 dpi or 1200 dpi.

13. The system of claim 8, wherein the system is implemented in a Xerographic printing system.

14. The system of claim 8, further comprising:
a decoder that receives encoding values; and
a mapping function that is configured to map at least one of the received encoding values to a value in the code book.

15. The system of claim 14 wherein the mapping function is implemented in the place of a user tone reproduction curve (TRC).

16. The system of claim 14 wherein the mapping function is implemented in the place of a calibration tone reproduction curve (TRC).

17. The system of claim 14 further comprising: a rendering device that is operative to render an image portion according to a decoded block of data.

18. The system of claim 17 wherein the rendering device comprises: a xerographic print engine.

* * * * *